United States Patent
Saito

(10) Patent No.: US 8,755,078 B2
(45) Date of Patent: Jun. 17, 2014

(54) PRINT IMAGE FORMING APPARATUS, COMPUTER READABLE MEDIUM STORING PROGRAM AND METHOD FOR FORMING PRINT IMAGE HAVING AN OVERT IDENTIFIER

(75) Inventor: Kazuo Saito, Minato-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 662 days.

(21) Appl. No.: 12/697,387

(22) Filed: Feb. 1, 2010

(65) Prior Publication Data
US 2011/0032547 A1 Feb. 10, 2011

(30) Foreign Application Priority Data

Aug. 4, 2009 (JP) .................................. 2009-181201

(51) Int. Cl.
*G06F 17/25* (2006.01)
*G06K 15/00* (2006.01)
*H04N 1/00* (2006.01)

(52) U.S. Cl.
USPC ........... 358/1.18; 358/1.6; 715/231; 715/232; 715/233

(58) Field of Classification Search
USPC .......... 358/3.28; 382/100, 232; 380/210, 287, 380/54; 713/176; 480/460; 386/94; 399/366; 283/902; 715/230–233
See application file for complete search history.

(56) References Cited

U.S. PATENT DOCUMENTS

| | | | | |
|---|---|---|---|---|
| 4,738,471 A | * | 4/1988 | Nielsen | ........................... 283/67 |
| 4,978,146 A | * | 12/1990 | Warther et al. | ................. 283/81 |
| 7,573,594 B2 | * | 8/2009 | Leslie et al. | ................. 358/1.15 |
| 7,653,947 B2 | * | 1/2010 | Hatano | ........................... 726/32 |
| 2008/0244721 A1 | * | 10/2008 | Barrus et al. | ....................... 726/9 |
| 2009/0019292 A1 | * | 1/2009 | Fransson et al. | .............. 713/193 |
| 2009/0070348 A1 | | 3/2009 | Uejo | |
| 2009/0147280 A1 | * | 6/2009 | Yamaguchi et al. | ........... 358/1.9 |
| 2010/0188709 A1 | * | 7/2010 | Simske et al. | ................ 358/3.28 |

FOREIGN PATENT DOCUMENTS

| JP | 2003-134275 A | 5/2003 |
|---|---|---|
| JP | 2007-150876 A | 6/2007 |
| JP | 2009-71418 A | 4/2009 |

OTHER PUBLICATIONS

Japanese Office Action Dated Oct. 25, 2013 issued in Japanese Patent Application No. 2009-181201.

* cited by examiner

*Primary Examiner* — Barbara Reinier
(74) *Attorney, Agent, or Firm* — Sughrue Mion, PLLC

(57) ABSTRACT

A print image forming apparatus includes: an obtaining unit that obtains a document having at least one page; a color information generating unit that generates color information from an identifier allocated to and associated with the obtained document according to a predetermined rule; and a forming unit that forms an image to be output, in which the identifier represented by a color which is in accordance with the generated color information is added to the document.

9 Claims, 5 Drawing Sheets

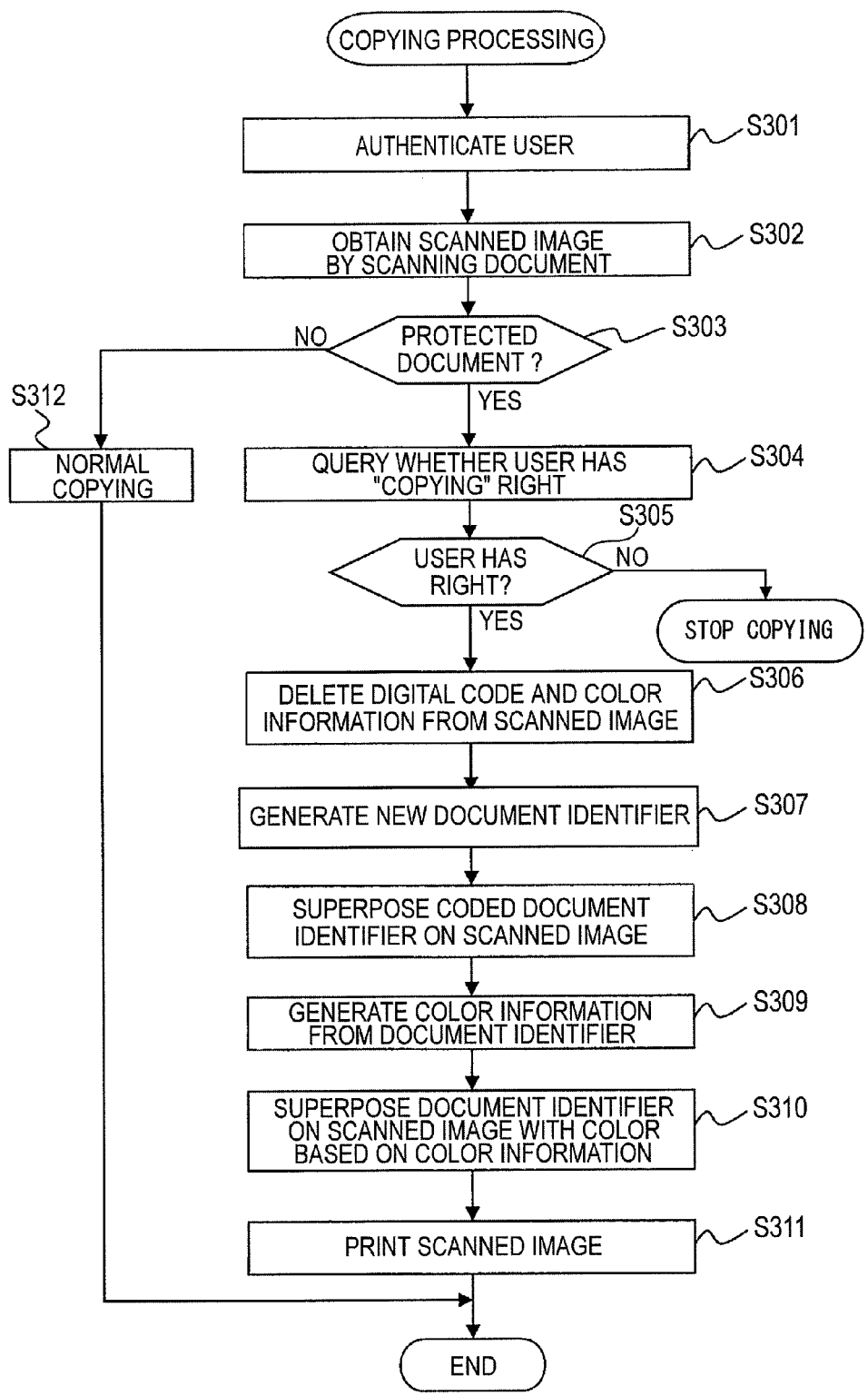

PRINT IMAGE FORMING APPARATUS, COMPUTER READABLE MEDIUM STORING PROGRAM AND METHOD FOR FORMING PRINT IMAGE HAVING AN OVERT IDENTIFIER

CROSS-REFERENCE TO RELATED APPLICATIONS

This application is based on and claims priority under 35 USC 119 from Japanese Patent Application No. 2009-181201 filed Aug. 4, 2009.

BACKGROUND

1. Technical Field

The present invention relates to a print image forming apparatus, a computer readable medium storing a program and a method for forming a print image.

2. Related Art

In order to achieve various objects including protection against abuse of documents, it has been recently adopted in some cases that an identifier is allocated to a document to be printed and each page constituting the document is printed out with the identifier. The identifier is printed while being expressed with a character string or encoded into a predetermined code (e.g., QR Code and barcode) so that a computer or the like can easily process the identifier.

When a printer is shared by plural users, print materials which are printed in response to instructions of the users may be put together on a tray of the printer.

SUMMARY

According to an aspect of the invention, there is provided a print image forming apparatus including: an obtaining unit that obtains a document having at least one page; a color information generating unit that generates color information from an identifier allocated to and associated with the obtained document according to a predetermined rule; and a forming unit that forms an image to be output, in which the identifier represented by a color which is in accordance with the generated color information is added to the document.

BRIEF DESCRIPTION OF THE DRAWINGS

Exemplary embodiments of the present invention will be described in detail based on the following figures, wherein:

FIG. 10 is a flowchart of illustrating a series of processing to copy a document in the third exemplary embodiment of the present invention.

DETAILED DESCRIPTION

Exemplary embodiments of the present invention will be hereinafter described with reference to the accompanying drawings.

First Exemplary Embodiment

Figure 1:
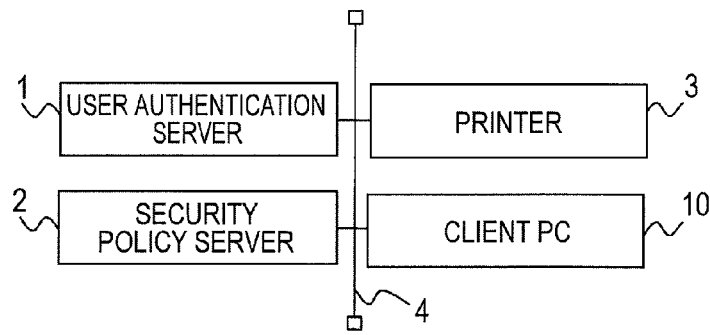
FIG. 1 is a diagram showing an entire configuration of a content security system according to a first exemplary embodiment of the present invention.

FIG. 1 is a diagram showing the configuration of a content security system according to a first exemplary embodiment of the present invention. The content security system controls and manages usage of an electronic document and a paper document by allocating identifiers to these documents.

FIG. 1 shows a configuration that a user authenticate server 1, a security policy server 2, a printer 3 and a client PC 10 are connected to a network 4. The first exemplary embodiment exemplifies a configuration that the client PC 10 is provided as a print image forming apparatus according to this exemplary embodiment. The user authenticate server 1 manages user authentication in an integrated fashion. Other machines including the client PC 10 are controlled so that users are certified and then these machines are usable by certified users. In this case, the machines execute user authentication by querying to the user authenticate server 1.

The user authenticate server 1 may be a LDAP server, a Windows (registered trademark) Active Directory server or the like. The security policy server 2 has a role of managing a right to access an electronic document protected by security (hereinafter referred to as "protected document"). For example, the security policy server 2 may be an existing server such as Windows (registered trademark) Rights Management Services (Microsoft Corporation) or a LiveCycle Policy Service (Adobe Systems Incorporated). The printer 3 is a network-adaptable printer. The printer 3 executes printing in response to printing requests from the other machines including the client PC 10. In the first exemplary embodiment, existing apparatuses may be used as the user authenticate server 1, the security policy server 2 and the printer 3.

Figure 2:
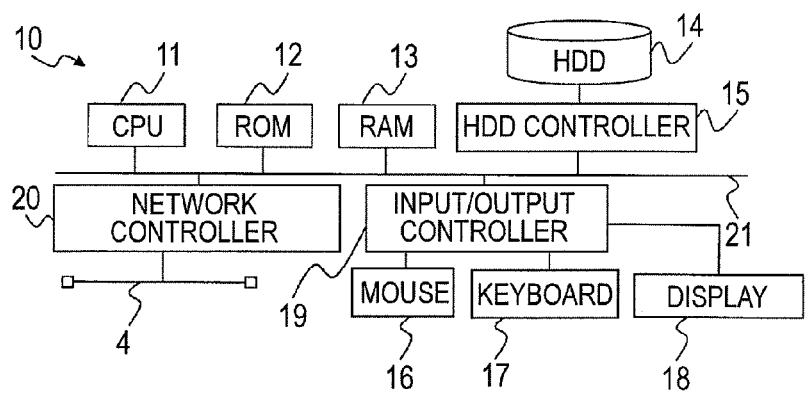
FIG. 2 is a diagram showing a hardware configuration of a computer functioning as a client PC in the first exemplary embodiment of the present invention.

FIG. 2 is a diagram showing a hardware configuration of a computer functioning as the client PC 10 in the first exemplary embodiment. The computer functioning as the client PC 10 in the first exemplary embodiment can be implemented with a well-known general hardware configuration. In short, the computer is configured by connecting CPU 11, ROM 12, RAM 13, a HDD controller 15, an input/output controller 19 and a network controller 20 provided as a communication unit to an internal bus 21 as shown in FIG. 2. Furthermore, a hard disk drive (HDD) 14 is connected to the HDD controller 15, and a mouse 16 and a keyboard 17 provided as an input unit and a display 18 provided as a display device are connected to the input/output controller 19.

The user authenticate server 1 and the security policy server 2 are also computers. Therefore, they can be illustrated to have the same hardware configuration as shown in FIG. 2.

Figure 3:
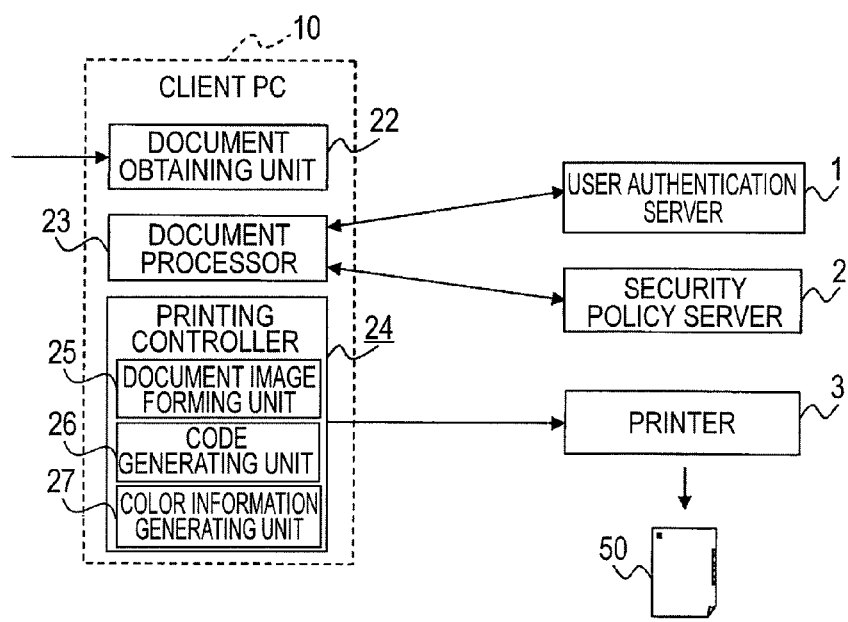
FIG. 3 is a block diagram showing the configuration of the client PC in the first exemplary embodiment of the present invention.

FIG. 3 is a diagram showing the configuration of the client PC 10 in the first exemplary embodiment. FIG. 3 does not show some elements unnecessary to explain the first exemplary embodiment. The client PC 10 includes a document obtaining unit 22, a document processor 23 and a printing controller 24. The document obtaining unit 22 reads an electronic document as a print target from a memory implemented by the HDD 14, and obtains it through the network 4. The document processor 23 is implemented by a document application, and when the obtained electronic document is not a protected document, the document application communicates with the security policy server 2 to change the obtained electronic document to a protected electronic document (or simply referred to as "protected document") by allocating a security policy to the obtained electronic document, or executes various processing (e.g., browsing, editing, and printing) in a permissible scope which is permitted on the security policy to the protected document.

The document processing application reads a document identifier embedded in an electronic document as a processing target. Further, the document processing application transmits the user information obtained as a result of user authentication to the security policy server 2, and also queries to the security policy server 2 as to whether a target user has right over the target document (e.g., browsing, editing and printing). When the target user has right, the document processing application allows the user to use the document within the scope of right. In printing, the document processing application generates printing data, and transfers both of the printing data and the document identifier embedded in the electronic document to a printer driver.

The printing controller 24 includes a document image forming unit 25, a code generating unit 26 and a color information generating unit 27. The printing controller 24 is implemented by a printer driver that provides a function of printing out a protected document while a document identifier allocated to an electronic document is embedded in paper. The code generating unit 26 generates code data (e.g., QR Code and barcode) by coding a document identifier. The color information generating unit 27 generates color information from a document identifier in accordance with a predetermined rule. Further, the color information generating unit 27 generates position information from a document identifier in accordance with a predetermined rule. The document image forming unit 25 forms a print image of an electronic document as a print target. In this case, the document image forming unit 25 embeds a digital code generated by the code generating unit 26 into a print image. Further, the document image forming unit 25 adds, to a print image, a document identifier expressed with a color based on the color information generated by the color information generating unit 27 so that the document identifier is printed at a position on a sheet which is based on position information generated by the color information generating unit 27.

Each of the components 22 to 24 in the client PC 10 is implemented by the cooperative operation of the computer functioning as the client PC 10 and a program executed by the CPU 11 mounted in the computer.

The programs used in the first exemplary embodiment can be provided through a communication tool. Alternatively, the programs can be provided while stored in a computer-readable recording medium such as CD-ROM or DVD-ROM. The programs provided through a communication tool or a recording medium is installed in a computer. When CPU of the computer sequentially executes the installed programs, various processing are implemented. The same is applied to other exemplary embodiments described later.

Figure 4:
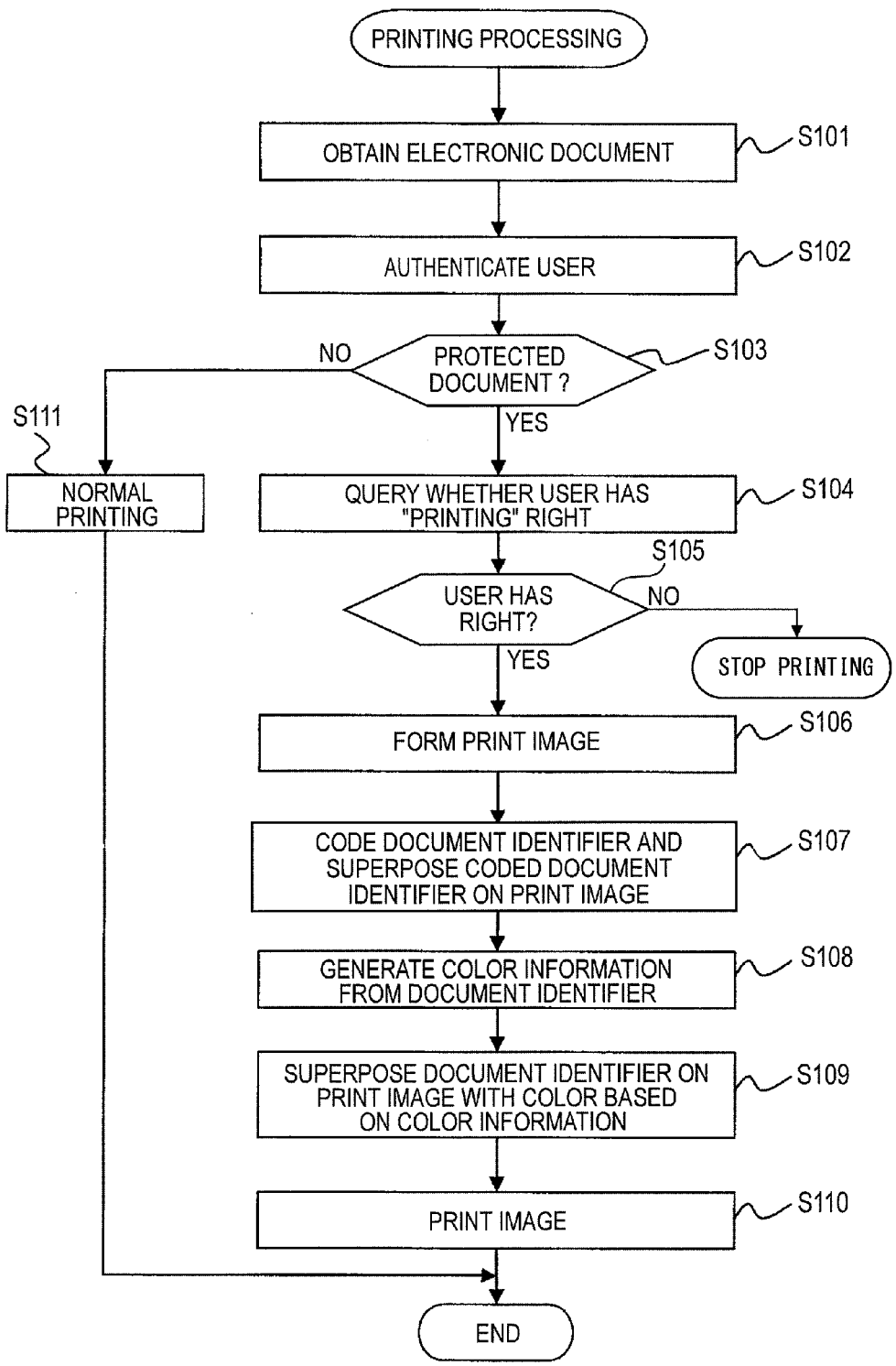
FIG. 4 is a flowchart of illustrating a series of processing to print out an electronic document as a print target in the first exemplary embodiment of the present invention.

Next, a series of processing of printing out an electronic document as a print target in the first exemplary embodiment will be described with reference to a flowchart shown in FIG. 4.

When the document obtaining unit 22 obtains an electronic document as a print target (Step 101), the document processor 23 executes user authentication by transmitting both of the obtained electronic document and the obtained user authentication information (user ID and a password) to the user authenticate server 1 (Step 102). Then, the document processor 23 checks whether a digital code of a document identifier is embedded in the obtained electronic document, thereby checking whether the electronic document is a protected document or not. An existing method can be used for the check processing, and thus description thereof is omitted. When the electronic document as a print target is not a protected document ("No" in Step 103), a normal printing operation is executed (Step 111). That is, when the document processor 23 transmits the obtained electronic document to the printing controller 24, the printing controller 24 forms a print image based on the electronic document and transmits the print image to the printer 3. The printer 3 is accordingly instructed to execute printing, and prints the print image on paper in response to the print instruction.

On the other hand, when the electronic document as a print target is a protected document ("Yes" in Step 103), the document processor 23 transmits both of the user ID and the document identifier obtained by decoding the image of the protected document to the security policy server 2 as parameters, and queries to the security policy server 2 as to whether the user has right to print out the target protected document (Step 104). When the user has right ("Yes" in Step 105), the document processor 23 transfers both of the image of the protected document and the document identifier to the printing controller 24. On the other hand, when the user does not have right ("No" in Step 105), the printing processing is stopped. In this case, a message may be displayed on the display 18 to inform a user of the fact that he/she does not have right.

In order to enable individual identification of a paper document created through printing of a print image every document, a unique identifier (i.e., document identifier) is allocated to each paper document on the document basis. In other words, when printing is executed twice, it is assumed that different document identifiers are allocated to those paper documents which are printed in the first printing operation and the second printing operation. This is called as "derivation". Management of the relation of "derivation" by the security policy server 2 makes it possible to trace back a history as to what kind of process the document held currently at the user's hand has passed through. Accordingly, when printing is executed, the document processing application does not transfer the document identifier allocated to a protected document to the printer driver, but generates a new document identifier for a printed paper document to be printed from now and transfers the thus-generated new document identifier to the printer driver. Further, the security policy server 2 manages the "derivation". Therefore, the document processing application executes the processing of notifying a pair of the document identifier for the obtained protected document and the document identifier for the paper document from the document processing application to the security policy server 2. An existing method may be used for the above processing.

When receiving the image of the protected document and the identifier thereof, the document image forming unit 25 in the printing controller 24 forms a print image from the image of the protected document (Step 106). The print image is herein printable by the printer 3. Subsequently, the code generating unit 26 generates a digital code by coding the document identifier into a predetermined code such as a barcode. The document image forming unit 25 superposes the digital code on the print image of the protected document (Step 107). The superposed position and the like are set in advance. The foregoing processing is well known.

According to the first exemplary embodiment, the color information generating unit 27 further generates color information for identifying a document based on a document identifier according to a predetermined rule (Step 108). The document image forming unit 25 superposes, on the print image, the document identifier which is expressed with color(s) created in accordance with the color information (Step 109). The printing controller 24 transmits the thus-formed print image to the printer 3, and causes the printer 3 to print the print image (Step 110). Thus, a paper document 50 is printed out while including the digital code and the document identifier expressed with color (s) created in accordance with the color information.

Now, an example of the processing of generating color information which is a feature of the first exemplary embodiment, and an example of a predetermined rule will be hereinafter described in detail with reference to FIG. 5.

Figure 5:
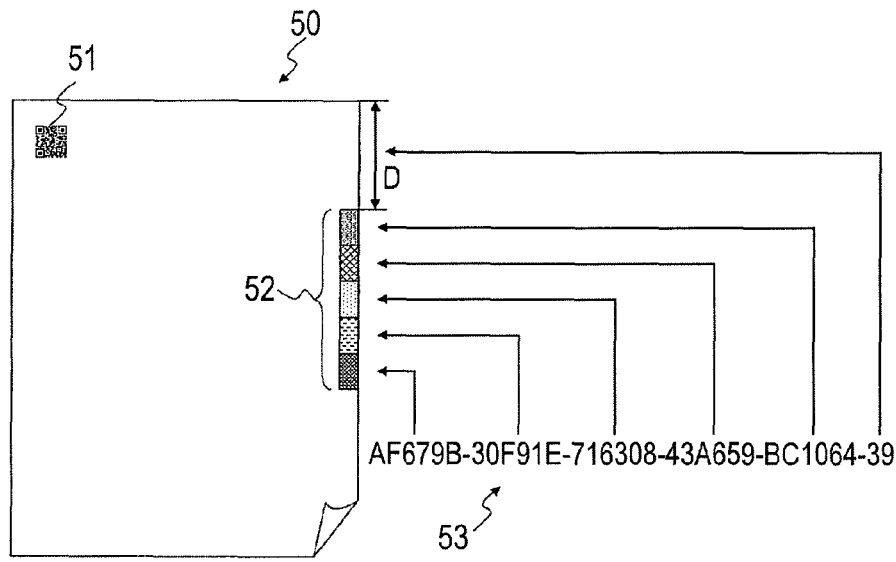
FIG. 5 is a diagram showing an example of a paper document printed in the first exemplary embodiment of the present invention.

FIG. 5 shows an example of the paper document 50 on which a document identifier expressed with colors is printed. FIG. 5 shows a document identifier 51 which is digital-coded into a QR Code and a document identifier 52 expressed with colors, and the content of the document itself is omitted from illustration.

A UUID (Universally Unique Identifier) is used in the first exemplary embodiment. The UUID can be uniquely specified as a document identifier, and it is expressed by the binary data of 16 bytes. In the first exemplary embodiment, a UUID 53 is divided into five groups (i.e., blocks) sequentially from the data head thereof. Each block has 24 bits (i.e., 3 bytes) and is treated as a color in the RGB full range of colors. For example, FIG. 5 exemplifies a head block "AF679B" in the UUID 53. In the block "AF679B", "AF", "67" and "9B" are allocated as red, green and blue, respectively. Further, each color is converted into color information of a predetermined rectangular shape having a predetermined size. The color information is printed on an edge 52 of a longer side of paper. In this case, the remaining one byte out of 16 bytes is used as an offset D in accordance with a predetermined rule. The offset D corresponds to the distance from the top edge of the longer side and is set in the range from 0 to 255 mm. Thus, the color information generated as a result of the conversion of the UUID includes not only information about colors of the blocks, but also the shapes and the sizes of the when the respective colors are printed on paper, and further includes information necessary to print a document identifier expressed with colors (e.g., information for specifying a sequence of colors and positions of the colors to be printed on paper).

As described above, according to the first exemplary embodiment, a print image is formed while an identifier expressed with a color which is in accordance with color information generated from a document identifier is added to a print image of a protected document so that the document identifier can be printed with visible color. When the protected document includes plural pages, the document identifier is printed on the edges of the respective pages in the same color pattern. The UUID is set on a document-by-document basis. In other words, when documents are different from one another, the document identifiers for these different documents are printed in different color patterns.

The method for the conversion to the color information is not limited to the foregoing method. For example, when a color space printable by the printer 3 is not full color, plural color rectangular boxes may be aligned while the color space is reduced. Alternatively, the color space may be interpreted not as the RGB color space but as the YMCK color space. Further, monochrome grayscale images with different gradations may be used instead of the color information. In this case, the grayscale images with different gradations may be individually allocated to the respective blocks generated from the UUID.

Further in the exemplary embodiment of the present invention, the UUID is divided into five blocks. However, the number of blocks is not necessarily limited to five. Also, the UUID is divided into five blocks in accordance with the bit sequence. However, the division method is not necessarily limited to this style.

Further, the printing positions of color rectangular boxes on paper may be determined as a result of calculation by using a part of a document identifier on a case-by-case basis as described above. Alternatively, the printing positions of color rectangular boxes may be set to predetermined fixed positions. In addition, the bit size and position of the UUID used for obtaining the position information are not limited to the above example. Further, in the first exemplary embodiment, the printing position is determined based on the bit data remaining after the color is obtained. However, the bit data used for obtaining the color may be repetitively used for position determination. Further, various other positioning methods may be applied. For example, the printing position of the document identifier may be set not only to the long side of paper, but also to a short side thereof or all sides thereof. Alternatively, the printing position may be changed in accordance with the document identifier. In the first exemplary embodiment, the printing position of the document identifier is set to the edge of paper so that the document identifier is prevented from being superposed on the image of the protected document. In some kind of document, however, the printing position of the document identifier is not necessarily set to the edge of paper.

In the foregoing description, the color is printed in rectangular-box shapes on paper. The size and shape of each rectangular box may be determined by the calculation based on a document identifier. Furthermore, in the first exemplary embodiment, the rectangular boxes having different colors are linearly aligned along the edge of paper without any clearance when they are printed on the sheet of paper. However, the position intervals and alignment of the rectangular boxes having different colors are not limited to the example shown in FIG. 5. For example, the rectangular boxes may be printed on paper through predetermined intervals or entirely aligned in an annular arrangement. Furthermore, colors are not necessarily printed in the rectangular-box shape. For example, colors may be formed in various shapes such as a circular shape, a triangle shape, and a star shape. Moreover, colors may be printed in different sizes.

Further, in the first exemplary embodiment, the UUID is used as an identifier associated with a document. However, other identification information (e.g., policy ID allocated to the protected document) may be used as an identifier associated with the document.

The foregoing modifications may be applied to exemplary embodiments described later.

Second Exemplary Embodiment

In the first exemplary embodiment, the client PC 10 is configured to execute the processing of generating color information based on a document identifier. In a second exemplary embodiment of the present invention, on the other hand, a multifunction machine executes the processing. In short, the second exemplary embodiment exemplifies a configuration that the multifunction machine is provided as a print image forming apparatus of an exemplary embodiment of the present invention. In this exemplary embodiment, the same constituent elements as the first exemplary embodiment are represented by the same reference numerals.

Figure 6:
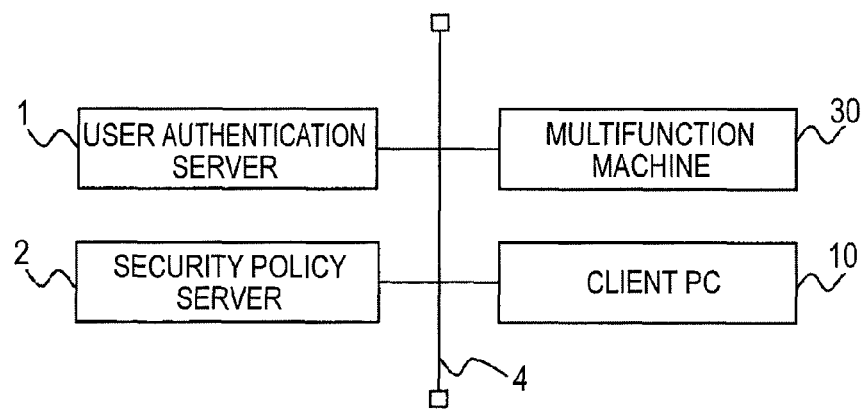
FIG. 6 is a diagram showing an entire configuration a content security system according a second exemplary embodiment of the present invention.

FIG. 6 is a diagram showing the entire configuration of a content security system according to the second exemplary embodiment of the present invention. In the second exemplary embodiment, a multifunction machine 30, instead of a printer, is connected to the network 4. The multifunction machine 30 is an exemplary form of an image forming apparatus having various functions such as a print function, a copy function, and a usage control function for a paper document. The multifunction machine 30 executes printing in response to a printing request from other machines (e.g., the client PC 10) as in the case of the printer.

Figure 7:
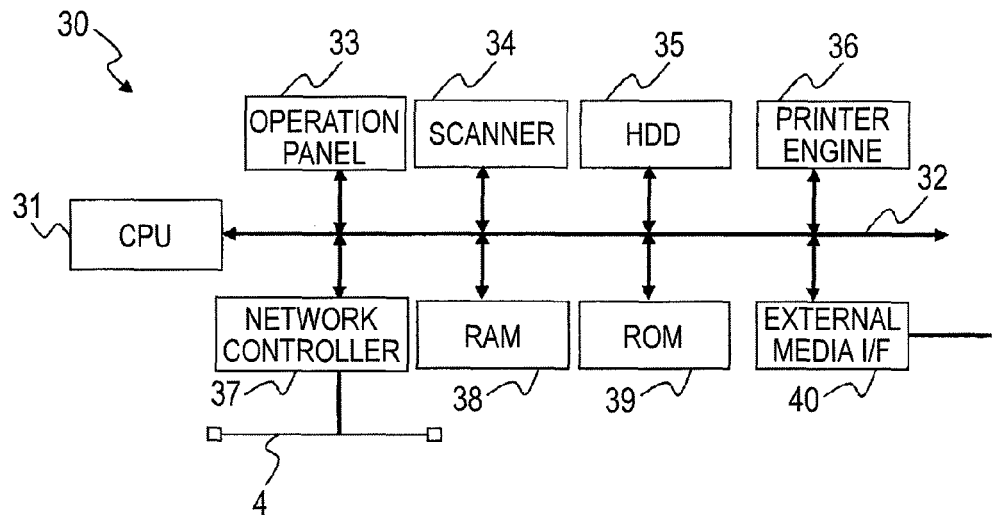
FIG. 7 is a diagram showing a hardware configuration of a multifunction machine in the second exemplary embodiment of the present invention.

FIG. 7 is a diagram showing the hardware configuration of the multifunction machine 30 in the second exemplary embodiment. As described above, the multifunction machine 30 is an exemplary form of the image forming apparatus having various functions such as the print function or the copy function as described above, and contains a computer therein.

In FIG. 7, CPU 31 controls the operations of various mechanisms mounted in the multifunction machine 30 (e.g., a scanner 34, a printer engine 36, etc.) in accordance with programs stored in a ROM 39. An address data bus 32 is connected to various mechanisms as control targets to be controlled by the CPU 31 to perform data communication. An operation panel 33 accepts an instruction from a user and displays information. The scanner 34 scans a document set by a user and stores the read document as electric data in HDD (Hard Disk Drive) 35 or the like. HDD 35 stores an electronic document scanned by the scanner 34, etc. The printer engine 36 prints an image on output paper in accordance with an instruction from a control program executed by the CPU 31. A network controller 37 is connected to the network 4 and used to receive a print image, etc. RAM 38 is used as a work memory during execution of a program and a communication buffer during reception/transmission of electric data. ROM 39 stores various programs relating to control or security of the multifunction machine 30. When various programs are executed, respective constituent elements described later execute predetermined processing functions. An external media I/F (interface) 40 serves as an interface of the multifunction machine 30 with external memory devices such as a USB memory or a flash memory).

Figure 8:
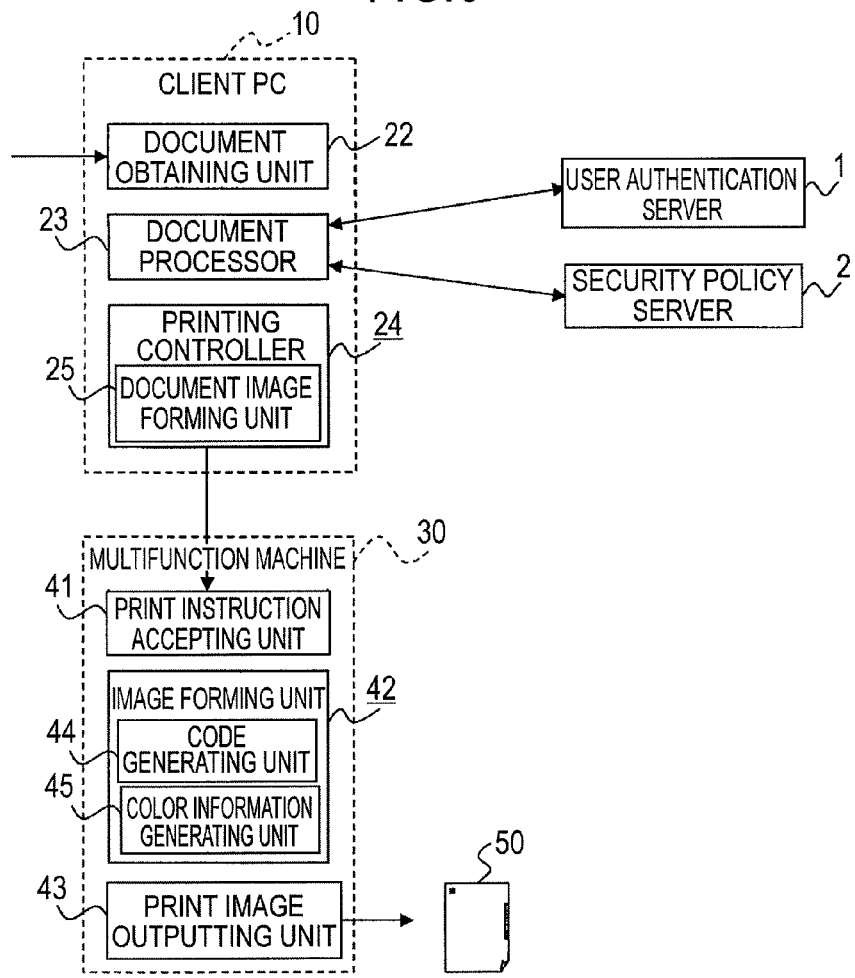
FIG. 8 is a block diagram showing the configuration of the client PC and the multifunction machine in the second exemplary embodiment of the present invention.

FIG. 8 is a block diagram showing the configurations of the client PC 10 and the multifunction machine 30 in the second exemplary embodiment. FIG. 8 does not herein show some elements unnecessary to explain the second exemplary embodiment. The client PC 10 includes the document obtaining unit 22, the document processor 23 and the printing controller 24. Among them, the document obtaining unit 22 and the document processor 23 may be the same as those in the first exemplary embodiment. On the other hand, the printing controller 24 includes the document image forming unit 25, and is implemented by a printer driver that provides a function of printing a protected document under a condition that a document identifier allocated to an electronic document is embedded in paper when the protected document is printed. In other words, a well-known machine may be used as the client PC 10 without modifying the machine.

The multifunction machine 30 includes a print instruction accepting unit 41, an image forming unit 42 and a print image output unit 43. The print instruction accepting unit 41 accepts a print instruction from the client PC 10. The image forming unit 42 forms a print image. A code generating unit 44 and a color information generating unit 45 which are included in the image forming unit 42 have the same functions as those of the code generating unit 26 and the color information generating unit 27 included in the printing controller 24 of the client PC 10 in the first exemplary embodiment. The print image output unit 43 transmits a formed print image to the printer engine 36 to execute printing.

Each of the constituent elements 22 to 24 in the client PC 10 is implemented by the cooperative operation of a computer functioning as the client PC 10 and a program executed by the CPU 11 mounted in the computer. Further, each of the constituent elements 41 to 43 in the multifunction machine 30 are implemented by the cooperative operation of a computer mounted in the multifunction machine 30 and a program executed by the CPU 31 mounted in the computer.

Next, a series of processing to print an electronic document as a print target in the second exemplary embodiment will be described. According to the processing in the second exemplary embodiment, the multifunction machine 30 executes the processing of generating a digital code and color information from a document identifier. Therefore, as compared with the first exemplary embodiment described with reference to FIG. 4, the processing of the second exemplary embodiment is basically the same as the first exemplary embodiment except that data transmission/reception is executed between the client PC 10 and the multifunction machine 30. Accordingly, the duplicative processing between the first and second exemplary embodiments will be properly omitted from the following description.

When the document obtaining unit 22 obtains an electronic document as a print target, the document processor 23 executes user authentication and checks whether a user has right to print, and also the document processor 23 obtains a new document identifier. The document image forming unit 25 in the printing controller 24 generates a print image printable by the printer 3 from an image of a protected document. Then, the document image forming unit 25 transmits a print instruction to the multifunction machine 30 together with the generated print image and the document identifier of the protected document.

When the print instruction accepting unit 41 in the multifunction machine 30 accepts a print instruction from the client PC 10, the code generating unit 44 generates a digital code by coding the accepted document identifier into a predetermined code (e.g., barcode). Further, when color information is generated from the document identifier accepted by the color information generating unit 45, the image forming unit 42 superposes, on the print image of the protected document, the digital code and the identifier expressed with the color which is in accordance with the color information. The print image output unit 43 transmits the thus-formed print image to the printer engine 36 to cause the printer engine 36 to print out it. As described above, there is printed the paper document 50 including the digital code and the document identifier expressed with the color which is in accordance with the color information.

Third Exemplary Embodiment

The first and second exemplary embodiments exemplify the case where the paper document 50 is obtained by printing.

On the other hand, according to an third exemplary embodiment of the present invention, the paper document 50 is obtained by copying.

Figure 9:
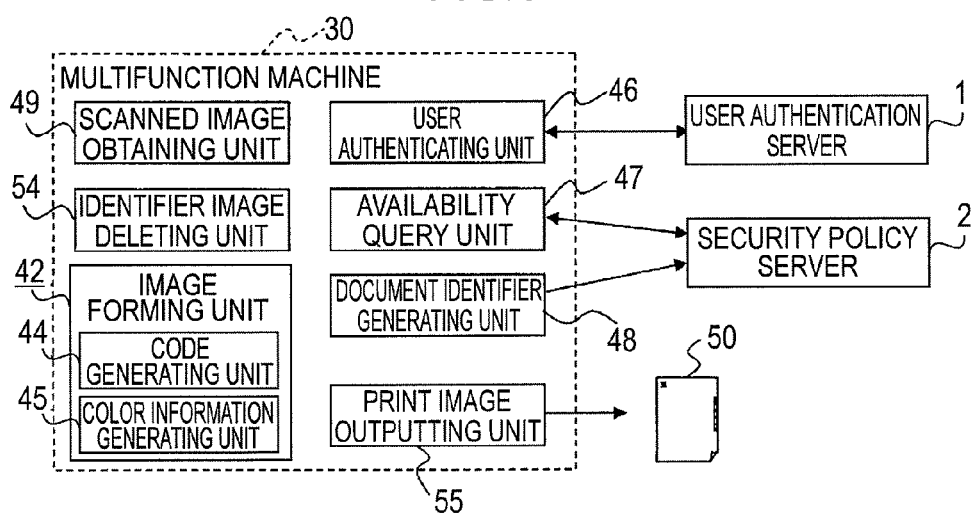
FIG. 9 is a block diagram showing the configuration of a multifunction machine according to a third exemplary embodiment of the present invention.

FIG. 9 is a block diagram showing the configuration of the multifunction machine 30 in the third exemplary embodiment. The third exemplary embodiment is different from the second exemplary embodiment in that the client PC 10 is not necessarily required.

The multifunction machine 30 according to the third exemplary embodiment includes a user authenticating unit 46, an availability query unit 47, a document identifier generating unit 48, a scanned image obtaining unit 49, an identifier image deleting unit 54, the image forming unit 42, and a print image output unit 55. The user authenticating unit 46 authenticates a user who tries to use the multifunction machine 30. The availability query unit 47 queries to the security policy server 2 about the presence or absence of a right with respect to a document which a user wants to use and what kind of usage of the document the user is allowed. Subsequently, the availability query unit 47 receives a query result from the security policy server 2. The document identifier generating unit 48 generates a new document identifier. According to the foregoing first and second exemplary embodiments, the document processor 23 has the functions of the user authenticating unit 46, the availability query unit 47 and the document identifier generating unit 48. The scanned image obtaining unit 49 obtains an image of the document scanned by the scanner 34. The identifier image deleting unit 54 deletes an image relating to the document identifier of the document from the scanned image. The image forming unit 42 forms an image to be printed by copying. The image forming unit 42 is the same as the second exemplary embodiment. The print image output unit 55 prints out the formed image on paper (for example, a sheet) using the printer engine 36.

The constituent elements 42, 46-49, 54 and 55 in the multifunction machine 30 are implemented by the cooperative operation of the computer mounted in the multifunction machine 30 and the programs executed by the CPU 31 mounted in the computer.

Next, the processing of copying a print target document in the third exemplary embodiment will be described with reference to a flowchart shown in FIG. 10.

When a user puts a paper document (a paper document to which document identifier information is allocated) on a platen of the multifunction machine 30 and presses a copy button, the user authenticating unit 46 prompts the user to input user authentication information. When the user inputs his/her user ID and a password, the user authenticating unit 46 transmits the user authentication information (i.e., the user ID and the password) to the user authentication server 1 for executing user authentication (Step 301). After the user authentication, the scanned image obtaining unit 49 obtains an image of the paper document obtained by scanning (Step 302). It is then checked whether a digital code of a document identifier is embedded in the scanned image, thereby checking whether the scanned document is a protected document or not. A well-known check method may be herein used for the check processing. Therefore, the description of the check processing is omitted from the following description. When the electronic document as a print target is not a protected document ("No" in Step 303), a normal copy processing is executed (Step 312).

On the other hand, when the scanned document is a protected document ("Yes" in Step 303), the availability query unit 47 transmits a document identifier obtained by decoding the scanned image and the user ID to the security policy server 2 as parameters, and queries to the security policy server 2 regarding whether or not the user has a right to copy the copy target document (Step 304). When the user does not have the right ("No" in Step 305), the copying is stopped. In this case, a message may be displayed on the operation panel 33 for informing the user of the fact that he/she does not have the right.

On the other hand, when the user has the right ("Yes" in Step 305), the identifier image deleting unit 54 deletes the image of the digital code from the scanned image. Further, when an image of the document identifier expressed with the color which is in accordance with the color information is printed, the identifier image deleting unit 54 deletes the image of the document identifier (Step 306).

Since this processing is a copy process of a paper document, and thus a new document is derived from the original document. Accordingly, the document identifier generating unit 48 generates a new document identifier (Step 307) and informs the security policy server 2 of the fact that the new document is derived from the original document together with the document identifiers of the original document and the derived document as parameters. Subsequently, the image forming unit 42 causes the code generating unit 26 to generate a digital code by coding the newly generated document identifier into a predetermined code (e.g., barcode), and superposes the digital code on the scanned image from which the document identifier has been already deleted (Step 308). The superposing position, etc. are set in advance. However, the superposing position is desirably set to be identical to the image area of the deleted digital code. The image forming unit 42 further causes the color information generating unit 45 to generate color information for identifying the document based on a document identifier in accordance with a predetermined rule (Step 309), and superposes the document identifier expressed with a color which is in accordance with the color information on the print image (Step 310). The processing of superposing the document identifier on the image may be the same as the first exemplary embodiment.

The print image output unit 55 prints out the thus-formed scanned image by using the printer engine 36 (Step 311). Thus, there is printed the paper document 50 including the digital code and the document identifier expressed by the color information.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

What is claimed is:

1. A print image forming apparatus comprising:
    an obtaining unit that obtains a document having at least one page;
    a color pattern information generating unit that generates color pattern information, from a code contained in a first identifier allocated to the obtained document, according to a rule; and
    a forming unit that forms an image to be output, in which a second identifier is added to the document, wherein the second identifier is an overt identifier represented by a color pattern having different colors, the color pattern being in accordance with the generated color pattern information, wherein the color pattern of the second identifier indicates a universally unique identifier (UUID), which is used as a document identifier of the document having at least one page, and wherein the color pattern information generating unit classifies bit data indicating the second identifier into a plurality of groups and generates color pattern information for setting a color for every group.

2. The print image forming apparatus according to claim 1, further comprising:

a position information generating unit that generates position information from the first identifier according to a rule, wherein the forming unit forms the image to be output so that the second identifier is printed at a position on a print medium that is specified by the position information.

3. The print image forming apparatus according to claim 1, wherein the second identifier provides readily apparent plain view identification of the document.

4. The print image forming apparatus according to claim 1, wherein the image to be output also includes the first identifier.

5. The print image forming apparatus according to claim 1, wherein the first identifier is a digitally coded quick response (QR) code.

6. The print image forming apparatus according to claim 1, wherein the color pattern of the second identifier is offset from a top edge of a longer side of the image to be output by a value of a last byte of the UUID.

7. The print image forming apparatus according to claim 1, wherein, when a copy process of the document including the first identifier and the second identifier is processed, the first identifier and the second identifier are deleted from a scanned image of the document.

8. A non-transitory computer readable medium storing a program causing a computer to execute a process for image formation, the process comprising:

obtaining a document having at least one page;

generating color pattern information, from a code contained in a first identifier allocated to the obtained document, according to a rule; and forming an image to be output, in which a second identifier is added to the document, wherein the second identifier is an overt identifier represented by a color pattern having different colors, the color pattern being in accordance with the generated color pattern information, wherein the color pattern of the second identifier indicates a universally unique identifier (UUID), which is used as a document identifier of the document having at least one page, and wherein the generating the color pattern information comprises classifying bit data indicating the second identifier into a plurality of groups and generating color pattern information for setting a color for every group.

9. A method for forming a print image, the method comprising:

obtaining a document having at least one page;

generating color pattern information, from a code contained in a first identifier allocated to the obtained document, according to a rule; and forming an image to be output, in which a second identifier is added to the document, wherein the second identifier is an overt identifier represented by a color pattern having different colors, the color pattern being in accordance with the generated color pattern information, wherein the color pattern of the second identifier indicates a universally unique identifier (UUID), which is used as a document identifier of the document having at least one page, and wherein the generating the color pattern information comprises classifying bit data indicating the second identifier into a plurality of groups and generating color pattern information for setting a color for every group.

\* \* \* \* \*